(12) United States Patent
Swartz et al.

(10) Patent No.: US 10,343,243 B2
(45) Date of Patent: Jul. 9, 2019

(54) METHODS AND APPARATUS FOR CONSTRUCTION OF MACHINE TOOLS

(71) Applicant: Robert Swartz, Highland Park, IL (US)

(72) Inventors: Robert Swartz, Highland Park, IL (US); Ilan Moyer, Belmont, MA (US)

(*) Notice: Subject to any disclaimer, the term of this patent is extended or adjusted under 35 U.S.C. 154(b) by 405 days.

(21) Appl. No.: 14/190,912

(22) Filed: Feb. 26, 2014

(65) Prior Publication Data

US 2014/0238173 A1 Aug. 28, 2014

Related U.S. Application Data

(60) Provisional application No. 61/769,740, filed on Feb. 26, 2013.

(51) Int. Cl.
*B23Q 1/25* (2006.01)
*B23Q 1/01* (2006.01)
*B23Q 1/62* (2006.01)
*B23Q 1/00* (2006.01)

(52) U.S. Cl.
CPC ............. *B23Q 1/25* (2013.01); *B23Q 1/0009* (2013.01); *B23Q 1/015* (2013.01); *B23Q 1/621* (2013.01); *Y10T 29/49826* (2015.01); *Y10T 29/49993* (2015.01); *Y10T 74/20207* (2015.01); *Y10T 408/91* (2015.01); *Y10T 409/307056* (2015.01); *Y10T 409/309576* (2015.01)

(58) Field of Classification Search
CPC ......... B23Q 1/015; B23Q 1/25; Y10T 408/91; Y10T 409/309576; Y10T 74/20354; Y10T 408/92; Y10T 408/93; Y10T 408/935; Y10T 409/309632; Y10T 409/309688; Y10T 409/309744; Y10T 409/3098; Y10T 409/309856; Y10T 409/309912
USPC ....... 409/235, 236, 237, 238, 239, 240, 241; 408/233, 234, 235, 236, 237; 74/490.09
See application file for complete search history.

(56) References Cited

U.S. PATENT DOCUMENTS

| | | | |
|---|---|---|---|
| 3,349,983 A | * | 10/1967 | Huff ................. B23K 9/0026 219/125.1 |
| 3,431,166 A | | 3/1969 | Mizutani |
| 4,312,268 A | | 1/1982 | King et al. |
| 4,393,389 A | | 7/1983 | Rasekhi et al. |

(Continued)

FOREIGN PATENT DOCUMENTS

| CN | 101181776 A | * | 5/2008 |
|---|---|---|---|
| CN | 201329424 Y | * | 10/2009 |

(Continued)

OTHER PUBLICATIONS

Non-Final Rejection in U.S. Appl. No. 14/199,603 ("Methods and Apparatus for Photosculpture"), dated Apr. 12, 2016.

(Continued)

*Primary Examiner* — Erica E Cadugan
*Assistant Examiner* — Michael Vitale
(74) *Attorney, Agent, or Firm* — Flachsbart & Greenspoon LLP; Robert P. Greenspoon

(57) ABSTRACT

Cement or other liquid-like material fills the hollow tubes of a machine tool under construction. The machine tool structures are held rigidly against a fixture while the substance dries. The machine tool so constructed is relatively lightweight and rigid, and obviates the need for precision machining of large portions of the apparatus.

10 Claims, 20 Drawing Sheets

(56) References Cited

U.S. PATENT DOCUMENTS

| | | | |
|---|---|---|---|
| 4,453,694 A * | 6/1984 | Andreasson | F16M 5/00 248/559 |
| 4,844,627 A * | 7/1989 | Speakman | F16C 23/045 384/208 |
| 4,863,538 A | 9/1989 | Deckard | |
| 4,865,359 A * | 9/1989 | Roberts | F16L 1/202 285/94 |
| 5,176,949 A | 1/1993 | Allagnat et al. | |
| 5,204,055 A | 4/1993 | Sachs et al. | |
| 5,260,009 A | 11/1993 | Penn | |
| 5,263,700 A | 11/1993 | Tubb et al. | |
| 5,340,656 A | 8/1994 | Sachs et al. | |
| 5,364,657 A | 11/1994 | Throne | |
| 5,369,192 A | 11/1994 | Ko et al. | |
| 5,514,232 A | 5/1996 | Burns | |
| 5,613,403 A * | 3/1997 | Takei | B23Q 1/621 108/143 |
| 5,637,175 A | 6/1997 | Feygin et al. | |
| 5,876,550 A | 3/1999 | Feygin et al. | |
| 5,988,959 A * | 11/1999 | Sugata | B23Q 1/0009 408/143 |
| 6,147,138 A | 11/2000 | Hochsmann et al. | |
| 6,161,995 A * | 12/2000 | Wakazono | B23Q 1/015 408/234 |
| 6,254,075 B1 * | 7/2001 | Kozima | B23Q 1/58 269/60 |
| 6,471,800 B2 | 10/2002 | Jang et al. | |
| 6,551,038 B1 * | 4/2003 | Sugata | B23Q 11/08 408/234 |
| 6,596,224 B1 | 7/2003 | Sachs et al. | |
| 6,632,054 B2 * | 10/2003 | Geiger | B23Q 1/012 29/33 P |
| 6,740,185 B2 | 5/2004 | Baldwin | |
| 6,780,368 B2 | 8/2004 | Liu et al. | |
| 8,377,547 B2 | 2/2013 | Noguchi et al. | |
| 2002/0104935 A1 * | 8/2002 | Schweizer | B23Q 1/0009 248/131 |
| 2004/0070582 A1 | 4/2004 | Smith et al. | |
| 2004/0112523 A1 | 6/2004 | Crom et al. | |
| 2005/0059757 A1 | 3/2005 | Bredt et al. | |
| 2006/0061618 A1 | 3/2006 | Hernandez et al. | |
| 2007/0241482 A1 | 10/2007 | Giller et al. | |
| 2008/0006958 A1 | 1/2008 | Davidson | |
| 2008/0260954 A1 | 10/2008 | Paton et al. | |
| 2009/0255428 A1 | 10/2009 | Stiel | |
| 2009/0321979 A1 | 12/2009 | Hiraide | |
| 2010/0302326 A1 | 12/2010 | Morohoshi et al. | |
| 2011/0045724 A1 | 2/2011 | Bahukudumbi | |
| 2011/0101564 A1 | 5/2011 | Keenihan et al. | |
| 2011/0121491 A1 | 5/2011 | Costabeber | |
| 2012/0059503 A1 | 3/2012 | Pax et al. | |
| 2013/0171431 A1 | 7/2013 | Swartz et al. | |
| 2014/0238173 A1 | 8/2014 | Swartz et al. | |
| 2014/0257549 A1 | 9/2014 | Swartz et al. | |
| 2015/0060933 A1 | 3/2015 | Ohno et al. | |
| 2015/0137423 A1 | 5/2015 | Ding | |
| 2015/0158246 A1 | 6/2015 | Swartz et al. | |
| 2015/0231825 A1 | 8/2015 | Swartz et al. | |
| 2016/0082657 A1 | 3/2016 | Swartz et al. | |
| 2016/0082658 A1 | 3/2016 | Swartz et al. | |
| 2016/0082695 A1 | 3/2016 | Swartz et al. | |
| 2016/0339645 A1 | 11/2016 | Swartz et al. | |
| 2017/0274595 A1 | 9/2017 | Swartz et al. | |
| 2017/0291223 A1 | 10/2017 | Swartz | |
| 2017/0297303 A1 | 10/2017 | Swartz | |

FOREIGN PATENT DOCUMENTS

| | | |
|---|---|---|
| CN | 104150915 A | 11/2014 |
| EP | 2776233 A2 | 9/2014 |
| EP | 2961585 A2 | 1/2016 |
| GB | 1335313 | 10/1973 |
| JP | 11236541 | 8/1999 |
| WO | WO-2007114895 A2 | 10/2007 |
| WO | WO-2013010108 A1 | 1/2013 |
| WO | WO-2013033273 A2 | 3/2013 |
| WO | WO-2014134224 A2 | 9/2014 |
| WO | WO-2015171182 A1 | 11/2015 |
| WO | WO-2017139766 A1 | 8/2017 |
| WO | WO-2017139766 A4 | 8/2017 |

OTHER PUBLICATIONS

Restriction Requirement in U.S. Appl. No. 14/566,661 ("Tow Stabilization Method and Apparatus"), dated Dec. 9, 2016.

Restriction Requirement in U.S. Appl. No. 14/703,372 ("Methods and Apparatus for Three Dimensional Printed Composites Based on Flattened Substrate Sheets"), dated Jul. 25, 2016.

Non-Final Rejection in U.S. Appl. No. 14/703,372 ("Methods and Apparatus for Three Dimensional Printed Composites Based on Flattened Substrate Sheets"), dated Dec. 22, 2016.

International Search Report and Written Opinion in International Application No. PCT/US16/62319 ("Additive Manufacturing Method and Apparatus"), dated Jan. 23, 2017.

International Search Report and Written Opinion in International Application No. PCT/US16/62356 (" . . . Metal Matrix Composites . . . "), dated Jan. 23, 2017.

Extended European Search Report in EP20140757160 ("Method and Apparatus for Three-Dimensional Printed Composites"), dated Jul. 4, 2016.

Restriction in U.S. Appl. No. 14/190,912 ("Methods and Apparatus for Construction of Machine Tools"), dated Dec. 1, 2015.

Restriction in U.S. Appl. No. 14/190,912 ("Methods and Apparatus for Construction of Machine Tools"), dated Jun. 24, 2016.

Non-Final Rejection in U.S. Appl. No. 14/190,912 ("Methods and Apparatus for Construction of Machine Tools"), dated Oct. 3, 2016.

International Search Report for PCT/US12/52946 ("Methods and Apparatus for 3D Fabrication"), dated Jan. 10, 2013.

J. Eltgen, A Short Review of Magnetography and Its Related Materials Problems, Ind. Eng. Chem. Prod. Res. Dev., vol. 24, No. 2, 1985, pp. 196-201.

Extended European Search Report, from EP Application No. 12828967 (EP20120828967) ("Methods and Apparatus for 3D Fabrication"), Jun. 9, 2015.

International Search Report for International Applicaton No. PCT/US14/18806 ("Methods and Apparatus for Three-Dimensional Printed Composites"), dated Aug. 5, 2014.

Invitation to Pay Additional Fees for International Applicaton No. PCT/US14/18806 ("Methods and Apparatus for Three-Dimensional Printed Composites"), dated May 6, 2014.

Decision on Protest for International Applicaton No. PCT/US14/18806 ("Methods and Apparatus for Three-Dimensional Printed Composites"), dated Jun. 19, 2014.

Restriction Requirement in U.S. Appl. No. 13/582,939 ("Methods and Apparatus for 3D Fabrication"), dated Sep. 30, 2015.

Non-Final Rejection in U.S. Appl. No. 13/582,939 ("Methods and Apparatus for 3D Fabrication"), dated Mar. 29, 2016.

Final Rejection in U.S. Appl. No. 13/582,939 ("Methods and Apparatus for 3D Fabrication"), dated Oct. 7, 2016.

Non-Final Rejection in U.S. Appl. No. 14/835,690 ("Apparatus for Fabricating Three-Dimensional Printed Composites"), dated Nov. 15, 2016.

Non-Final Rejection in U.S. Appl. No. 14/566,661 ("Tow Stabilization Method and Apparatus"), dated Mar. 21, 2017.

Applicant Initiated Interview Summary in U.S. Appl. No. 14/703,372 (" . . . Flattened Substrate Sheets"), dated Feb. 9, 2017.

Invitation to Pay Additional Fees for International Application No. PCT/US17/17672 ("Method/Apparatus Automated Composite-Based Additive Manufacturing"), dated Apr. 17, 2017.

Non-Final Rejection in U.S. Appl. No. 13/582,939 ("Methods and Apparatus for 3D Fabrication"), dated Apr. 27, 2017.

Decision on Protest for PCT/US17/17672 ("Method and Apparatus for Automated Composite-Based Additive Manufacturing"), dated May 26, 2017.

Final Rejection in U.S. Appl. No. 14/190,912 ("Methods and Apparatus for Construction of Machine Tools"), dated Jun. 13, 2017.

(56) References Cited

OTHER PUBLICATIONS

ISR and Written Opinion in PCT/US17/17672 ("Method and Apparatus for Automated Composite-Based Additive Manufacturing"), dated Jun. 27, 2017.
Hollingsworth & Vose (http://www.hollingsworth-vose.com/en/Products/Industrial-Products/Advanced-Fiber-Nonwovens/).
Evonik (http://corporate.evonik.com/en/products/search-products/pages/search.aspx?pfcmd=text&pfsearch=powder).
BNZ Materials (http://www.bnzmaterials.com/structural-insulation/cs85/).
Decision on PPH Request for U.S. Appl. No. 15/611,320 ("Method and Apparatus for Automated Composite-Based Additive Manufacturing"), dated Aug. 28, 2017.
Notice of Allowance for U.S. Appl. No. 14/835,690 ("Apparatus for Fabricating Three-Dimensional Printed Composites"), dated Aug. 31, 2017.
Examiner-Initiated Interview Summary for U.S. Appl. No. 14/835,690 ("Apparatus for Fabricating Three-Dimensional Printed Composites"), dated Aug. 31, 2017.
Notice of Allowance for U.S. Appl. No. 13/582,939 ("Methods and Apparatus for 3D Fabrication"), dated Jun. 21, 2017.
Examiner-Initiated Interview Summary for U.S. Appl. No. 13/582,939 ("Methods and Apparatus for 3D Fabrication"), dated Jun. 21, 2017.
Notice of Allowance for U.S. Appl. No. 14/703,372 ("Methods and Apparatus for Three-Dimensional Printed Composites Based on Flattened Substrate Sheets"), dated Aug. 11, 2017.
Terminal Disclaimer for U.S. Appl. No. 14/835,690 ("Apparatus for Fabricating Three-Dimensional Printed Composites"), dated Jul. 26, 2017.
Decision on PPH Request in U.S. Appl. No. 15/631,611 ("Additive Manufacturing Methods and Apparatus"), dated Sep. 19, 2017.
Corrected Notice of Allowance in U.S. Appl. No. 14/835,690 ("Apparatus for Fabricating Three-Dimensional Printed Composites"), dated Sep. 25, 2017.
Decision on PPH Request in U.S. Appl. No. 15/631,634 ("Apparatus and Process for Producing Additive Manufactured Metal Matrix Composites . . . "), dated Sep. 25, 2017.
Restriction in U.S. Appl. No. 15/611,320 ("Method and Apparatus for Automated Composite-Based Additive Manufacturing"), dated Oct. 18, 2017.
Decision on PPH Request in U.S. Appl. No. 15/631,634, dated Oct. 27, 2017 (" . . . Additive Manufactured Metal Matrix Composites . . . ").
Aerodyne Dust Collection Systems (http://www.dustcollectorhq.com/dust-collection-systems.html), last visited Nov. 16, 2017.
Oneida Cyclone (https://www.oneida-air.com/category.asp?Id=%7bCC6B6F2A-E3D7-4F18-A53C-B5C357DFE131%7d&utm_source=direct&utm_medium=redirect&utm_campaign=Dust_Deputy), Nov. 16, 2017.

* cited by examiner

METHODS AND APPARATUS FOR CONSTRUCTION OF MACHINE TOOLS

This application claims the benefit of U.S. Provisional Application No. 61/769,740, filed Feb. 26, 2013.

TECHNICAL FIELD OF THE INVENTION

The present invention relates generally to the construction of multi-axis machine tools, and methods for the same.

BACKGROUND OF THE INVENTION

A well-known technique for constructing inexpensive linear motion axes utilizes precision ground steel shafts—each fixed at both ends—upon which a carriage slides. An example of such a stage, constructed in accordance with the present invention, is shown in FIG. 3. Crucial to the proper function of this mechanism are the parallelism of both shafts and the precise alignment of guide bearings upon which the carriage slides on the precision shafts. Should the distance between the shafts vary, or if the distance between the shafts does not perfectly match that between the guide bearings, binding will occur. Achieving this precise alignment typically requires high precision machining of multiple different components.

In addition, one of the key challenges facing machine tool designers is to create rigid machine frames which resist tool deflection and which are also damped sufficiently to suppress vibrations. Another challenge is to create precision alignment both between the bearing elements comprising each axis, and between the various axes comprising a machine. For example, a standard 3-axis milling machine consists of X, Y, and Z axes which in the ideal case are perfectly orthogonal to each other. Traditional machine construction techniques rely on bulky castings, forgings, or extrusions to achieve stiffness and damping, and precision machining of components to achieve alignment within and between motion axes. These factors contribute to the cost of fabricating machine tools, and make it difficult to produce machine tools for the mass consumer market.

SUMMARY OF THE INVENTION

The present invention involves a lightweight (preferably aluminum) extrusion profile capable of providing the basis for most of the components of a linear motion stage without requiring significant precision post-machining, and a construction technique for utilizing these elements. Such a stage may be used within an overall frame that uses inexpensive structural materials and fabrication processes. In that regard, the invention also includes a construction technique for machine tools which utilizes a precision jig with an aluminum frame filled with cement or epoxy to create precise machine tools, as well as the machine tool so constructed.

DETAILED DESCRIPTION OF INVENTION

Figure 1:
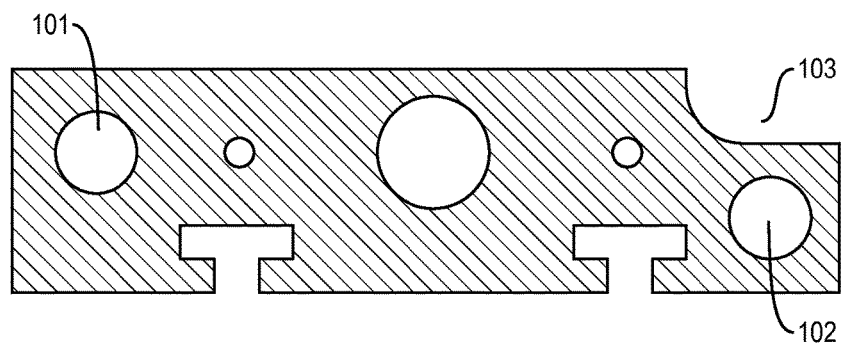
FIG. 1 is a cross section for an extrusion template that may be used to form the carriage and end blocks of the preferred embodiment.
Figure 2:
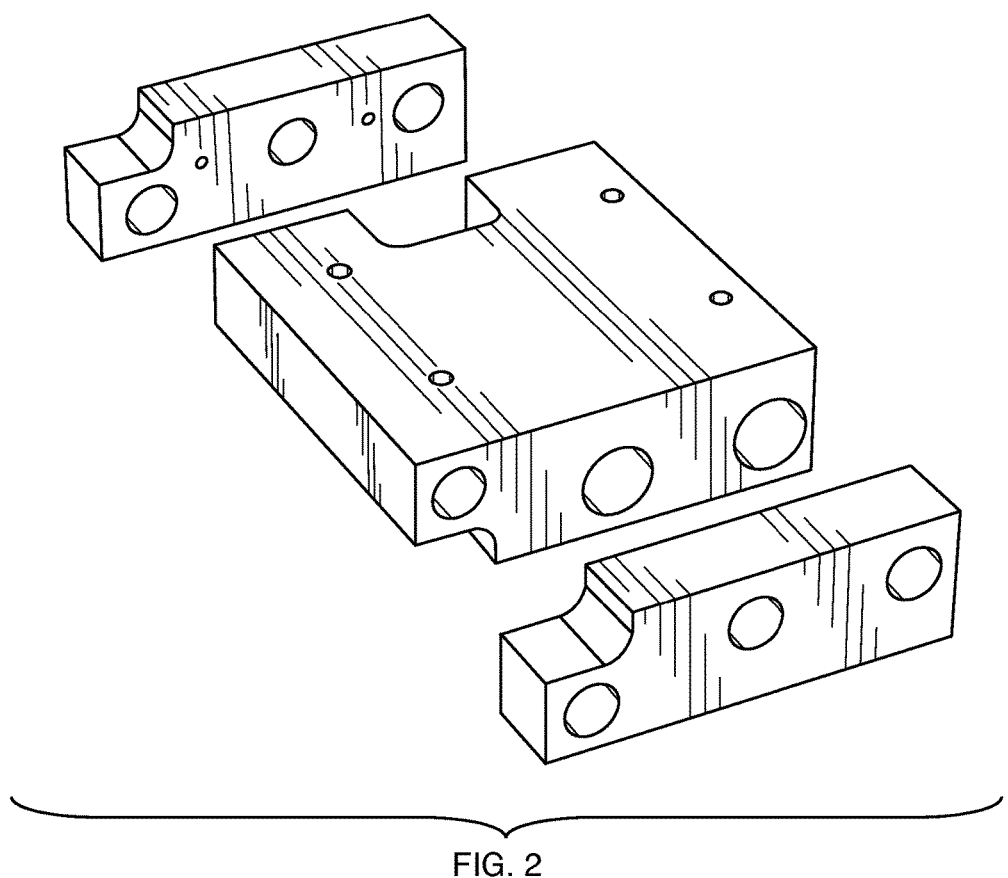
FIG. 2 is a stylized perspective view of the end blocks and carriage made from the extrusion template of FIG. 1 (omitting other machine tool structures), in their approximate orientation with one another.
Figure 3:
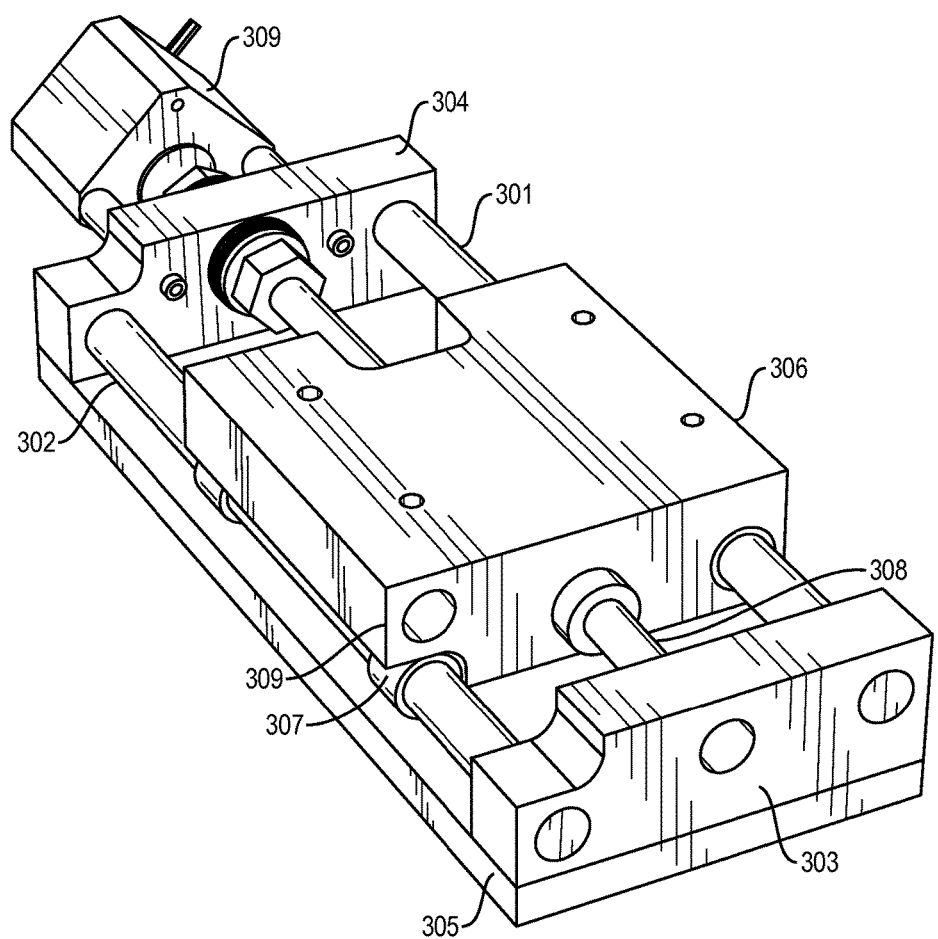
FIG. 3 is a perspective view of a complete linear motion stage in accordance with the preferred embodiment.

A complete linear motion stage constructed in accordance with this invention is shown in FIG. 3. Two guide shafts 301 and 302 are constrained at each end in two end blocks 303 and 304. The purpose of these end blocks is to support the guide shafts and to constrain them parallel to each other. Both end blocks are rigidly anchored to a base plate 305. A carriage 306 rides on bearings 307 fixed to the carriage 306, and these bearings slide on the guide shafts. In the embodiment of FIG. 3, a leadscrew 308 driven by a stepper motor 309 provides the motive force and position control of the carriage relative to the end blocks. However other drive mechanisms such as pulleys and belts, racks and pinions, etc. could be used. FIG. 2 demonstrates how a single extrusion profile (e.g., of FIG. 1) can be used as the basis for end blocks and carriage, while providing supplementary functionality such as motor mounting features, and t-slots which permit the extrusion to function as a machine work surface.

Preferably, the guide shafts 301 and 302 remain parallel along their entire length, so that the carriage moves smoothly. In order to accomplish this, the features in both end blocks which anchor the guide shafts are identically spaced. This is accomplished by two guide shaft seat features 101 and 102 in the extrusion profile (FIG. 1), one at each end of the extrusion profile. Because both end blocks are cut from the same extrusion, the distance between both features remains constant on both blocks. However it is possible that during the extrusion process, variation in the center distance between the shaft seat features may occur along the length of the extrusion or between lots of extrusion. If the variation proves to be within acceptable limits, the shafts can be pressed directly into the seats or the seats could be slightly undersized and then reamed to the shaft diameter. If the variation in seat center distance is too great, the seats can be manufactured undersized and then machined to size and in the proper locations on a CNC machining center with minimal material removal.

Preferably, the carriage slides smoothly and with minimal wear on the guide shafts. Rather than manufacture the carriage from a suitable bearing material with the necessary surface finish, a common technique is to attach off-the-shelf bearings to the carriage. In the present embodiment two bearings (i.e. a bearing "pair") are used per shaft. Preferably, the center distance between the bearing pairs is identical to that between the shafts if the carriage motion is to be smooth and low-friction. In order to accomplish this, one pair of bearings is press-fit into the carriage, while the other pair is left floating while surrounding the shaft, and then glued in-place onto the carriage. This construction technique permits the distance between the guide shafts to be copied to the bearings without requiring that the distance between the guide shafts is known during the manufacture of the carriage.

The two fixed bearings are pressed into the fixed bearing seat feature 101 (FIG. 1), which is formed by reaming the guide shaft seat feature to a size suitable for a press fit on the bearings. Because both bearings in the set are press-fit into a common hole (typically one from each side), they are de facto collinear. During the pressing process it may also help to install a shaft in both bearings to ensure that they press in straight.

Figure 4:
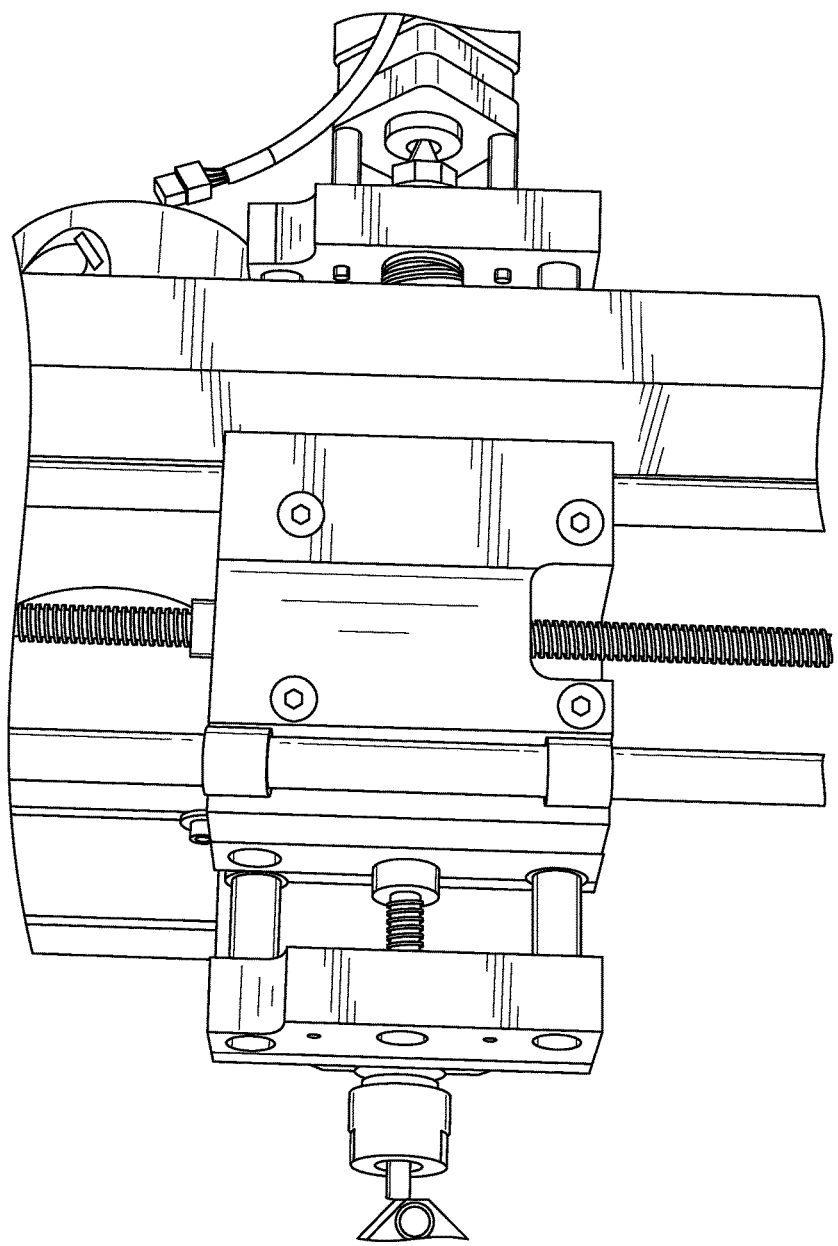
FIG. 4 is a perspective view of several linear motion stages of FIG. 3, stacked and oriented orthogonally.
Figure 5:
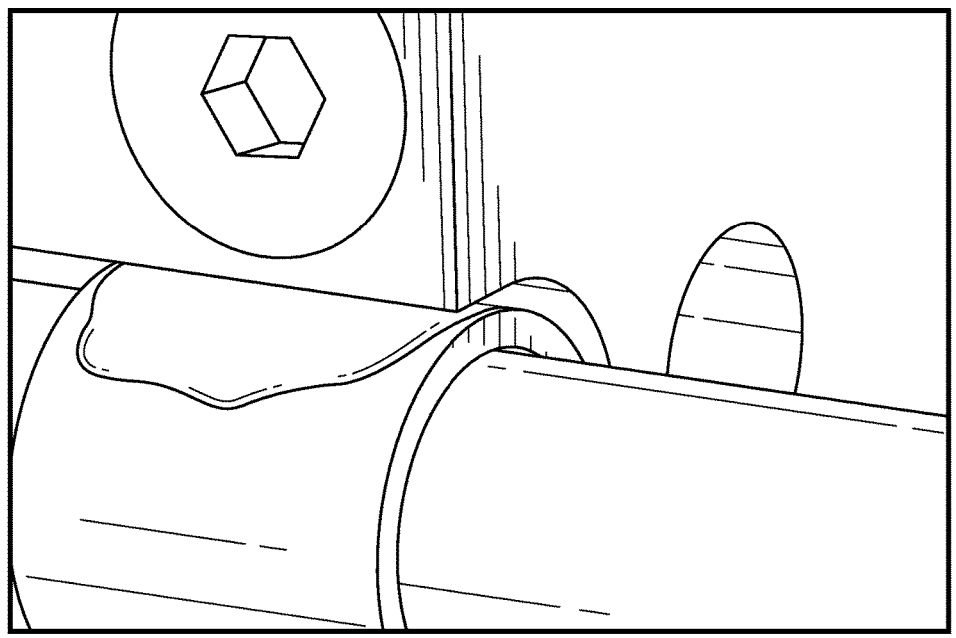
FIG. 5 is a detail showing epoxy between a floating bushing and the carriage of the preferred embodiment.
Figure 7:
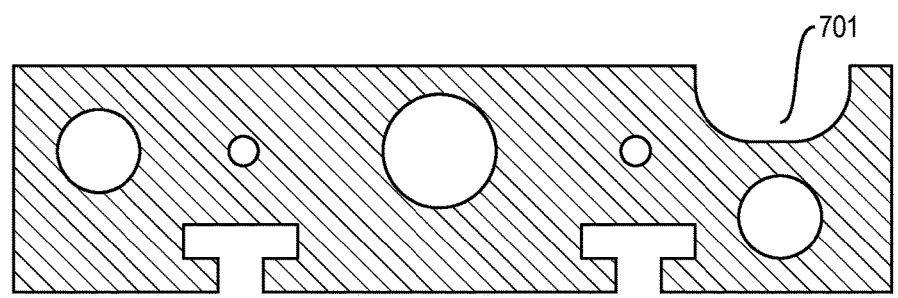
FIG. 7 is an alternative embodiment to the template of FIG. 1.
Figure 8:
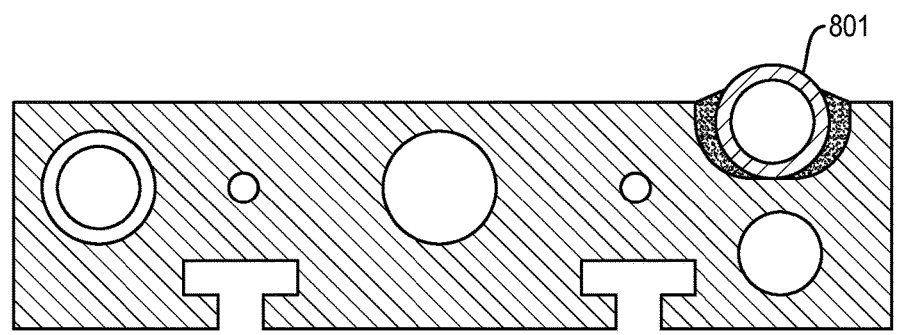
FIG. 8 is the template of FIG. 7 showing, in cross section, where a floating bushing would be glued in with epoxy and surrounded on two sides.

The two floating bearings are glued in place once the stage is mostly assembled. One of the two guide shafts is slipped through the fixed bearing sets, and the floating bearings are slipped onto the other shaft. Both shafts are then either pressed or slipped into the guide shaft seat features in the end blocks. If a slip-fit is used, additional reinforcement such as adhesive, set screws, or other means can be used to fix the guide shafts to the end blocks. Once the stage has been thus assembled, the distance between the guide shafts is set and the floating bearings can be glued to the carriage. The floating bearing seat surface 103 (FIG. 1) is designed so that when the bearings rest on this surface, the top surface of the carriage is parallel to the top surfaces of the end blocks 304 and 303 when the carriage 306 is oriented relative to the end blocks according to FIG. 3. With the bearings that enclose shaft 302 firmly resting on the floating bearing seat surface 103, adhesive is applied to the gaps between the bearings and the floating bearing seat surface, and the glue surface (FIG. 1). FIG. 4 shows an assembled carriage 306 from below, where epoxy was used as the adhesive between the floating bearing and the bearing seat surface 103. FIG. 5 is a detail showing epoxy applied between the bearing and the seat surfaces. The glue between the bearing and the glue surface acts in shear, greatly increasing the strength of the joint. FIGS. 7 and 8 illustrate 701 and 801 an improved design in which glue surfaces are located on both sides of the bearing, which increases resistance to peeling.

Figure 6:
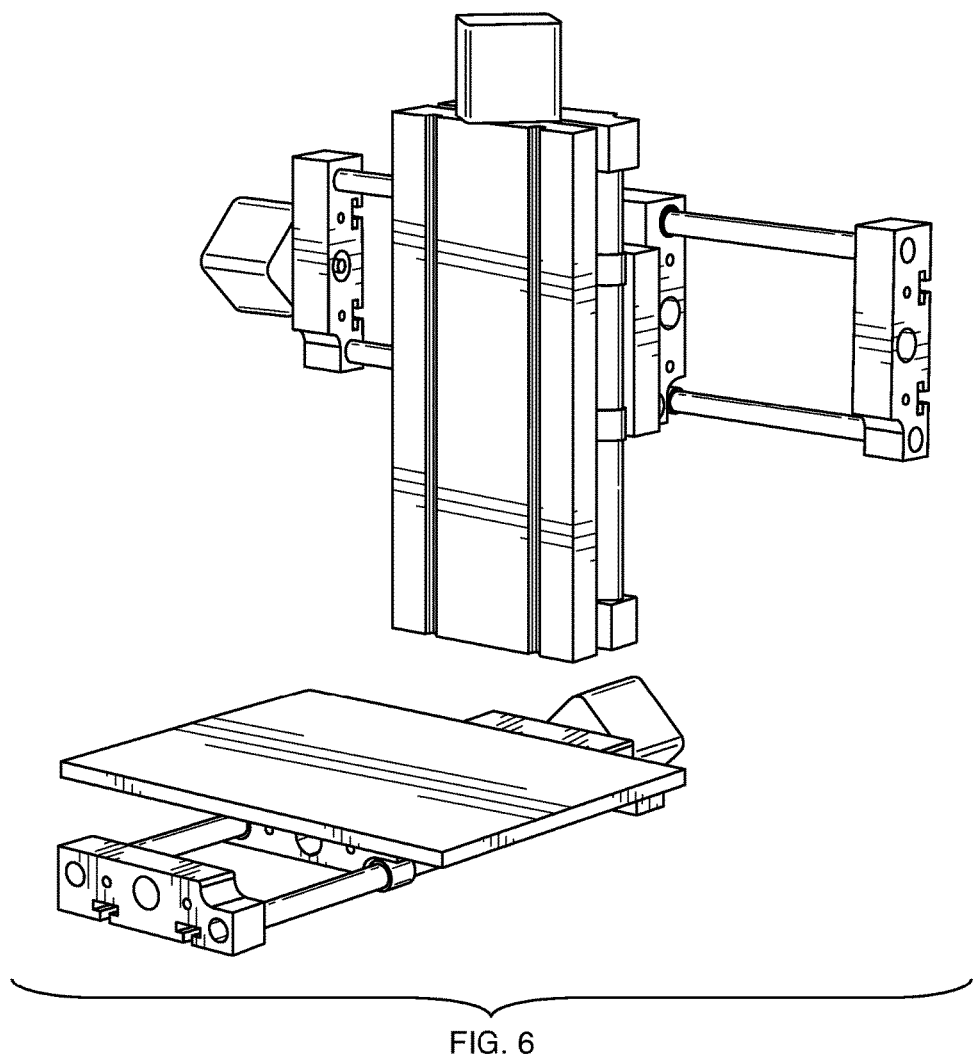
FIG. 6 is a stylized perspective view of two orthogonal linear motion stages exploded with respect to one another, showing the T-slots on the work surface of the vertical stage.

FIG. 4 shows how several axes constructed in this manner can be stacked to form multi-axis motion stages. FIG. 6 further elaborates on this point, and also shows how the same extrusion can be used to create the surface form of a work surface (the vertical rectangle as depicted in the figure) by including t-slot features into the extrusion.

Additional features are provided in the extrusion profile (FIG. 1) such as t-slots, motor mounting holes, and a hole which both clears the lead screw when used as an end block, and provides a mounting feature for a lead nut when the extrusion profile is used as a carriage.

Figure 9:
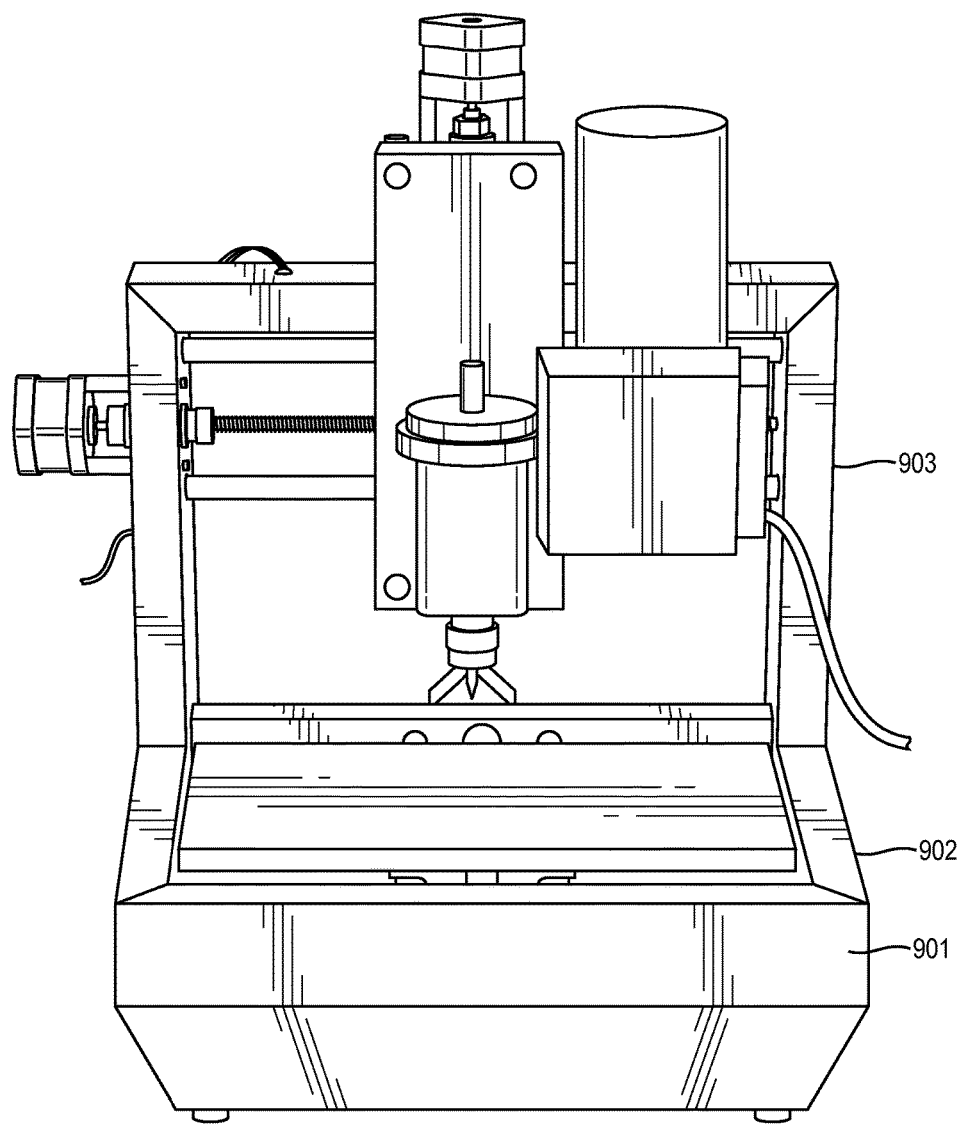
FIG. 9 is a perspective view of a machine tool constructed in accordance with the preferred embodiment.
Figure 10:
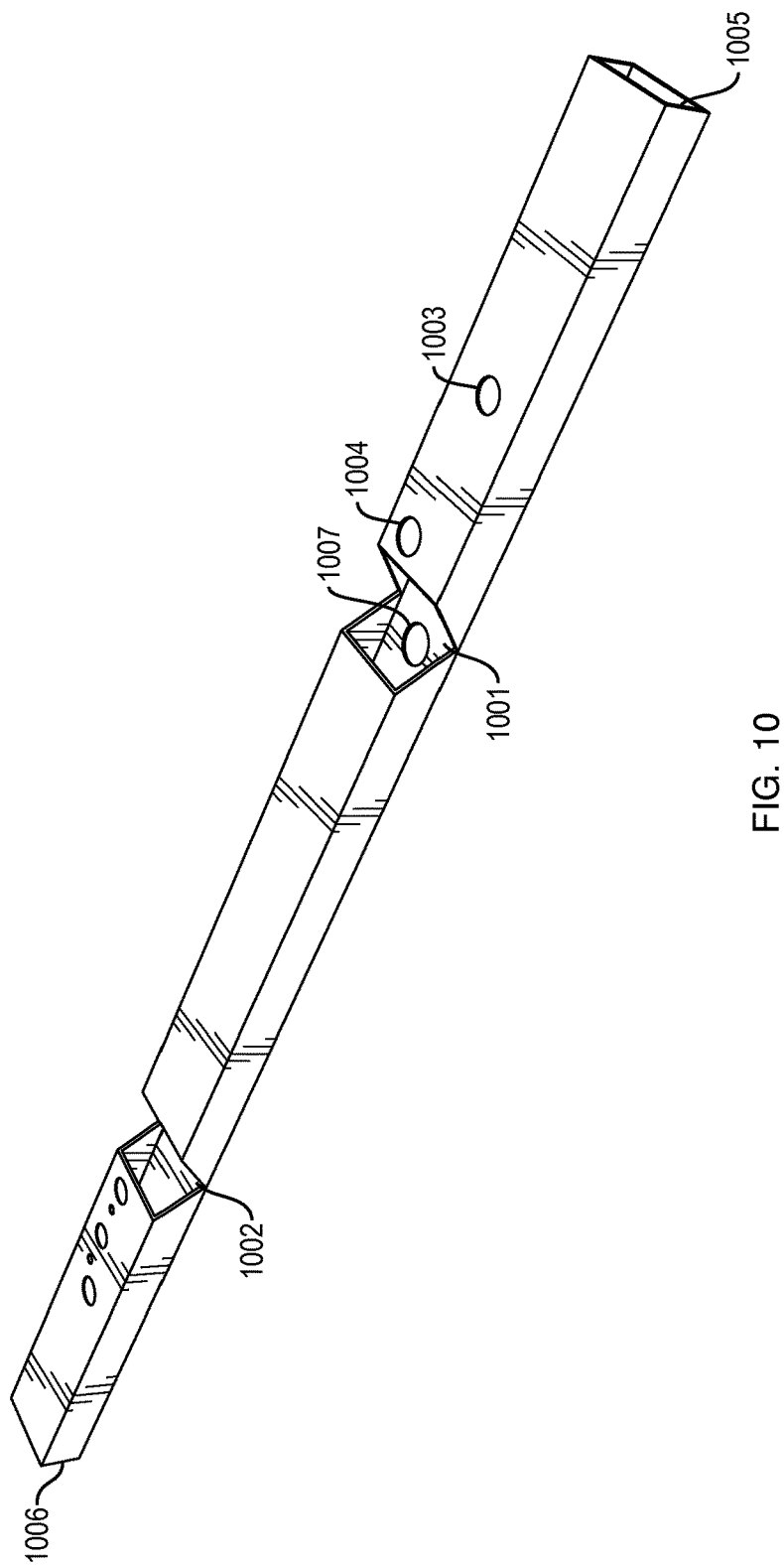
FIG. 10 is a perspective view of one length of thin-walled aluminum box extrusion.
Figure 11:
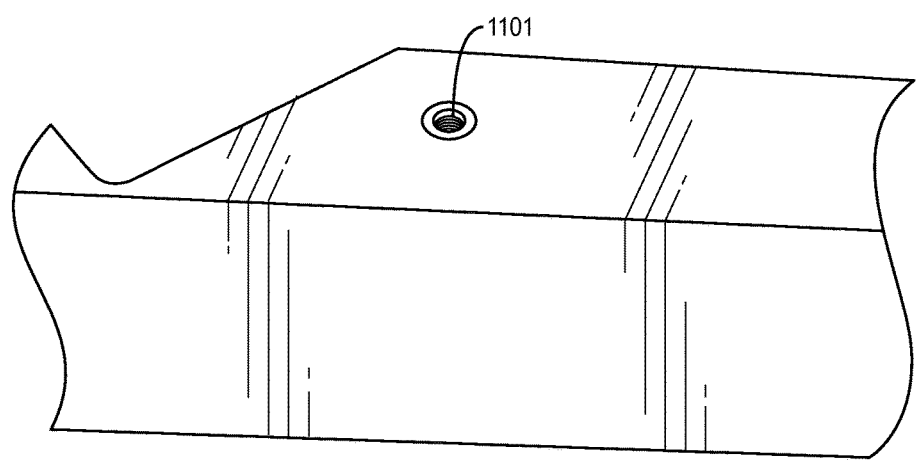
FIG. 11 is a detail of the extrusion of FIG. 10, showing a press fit insertion of a screw hole.

Turning to a second aspect of the present invention, a method of inexpensively manufacturing a machine tool is described. FIG. 9 shows a three-axis milling machine constructed in accordance with the invention. The structural frame of this machine is fabricated from thin-walled aluminum box extrusion 901 which has been filled with cement. However other fill materials such as epoxy for example may be used. FIG. 10 shows two such thin-walled box extrusions which have had features milled in them such as:

miter cuts at various locations to permit folding 1001 and 1002 holes which allow various elements such as motor standoffs or precision rods to pass into the interior of the tube, 1004 holes which pass entirely through the tube for elements such as lead screws 1003 fill ports into which cement will be poured, or which allow cement to flow from one tube to another.1005 and 1006 holes 1101 into which threaded inserts can be pressed (as in FIG. 11).

Figure 12:
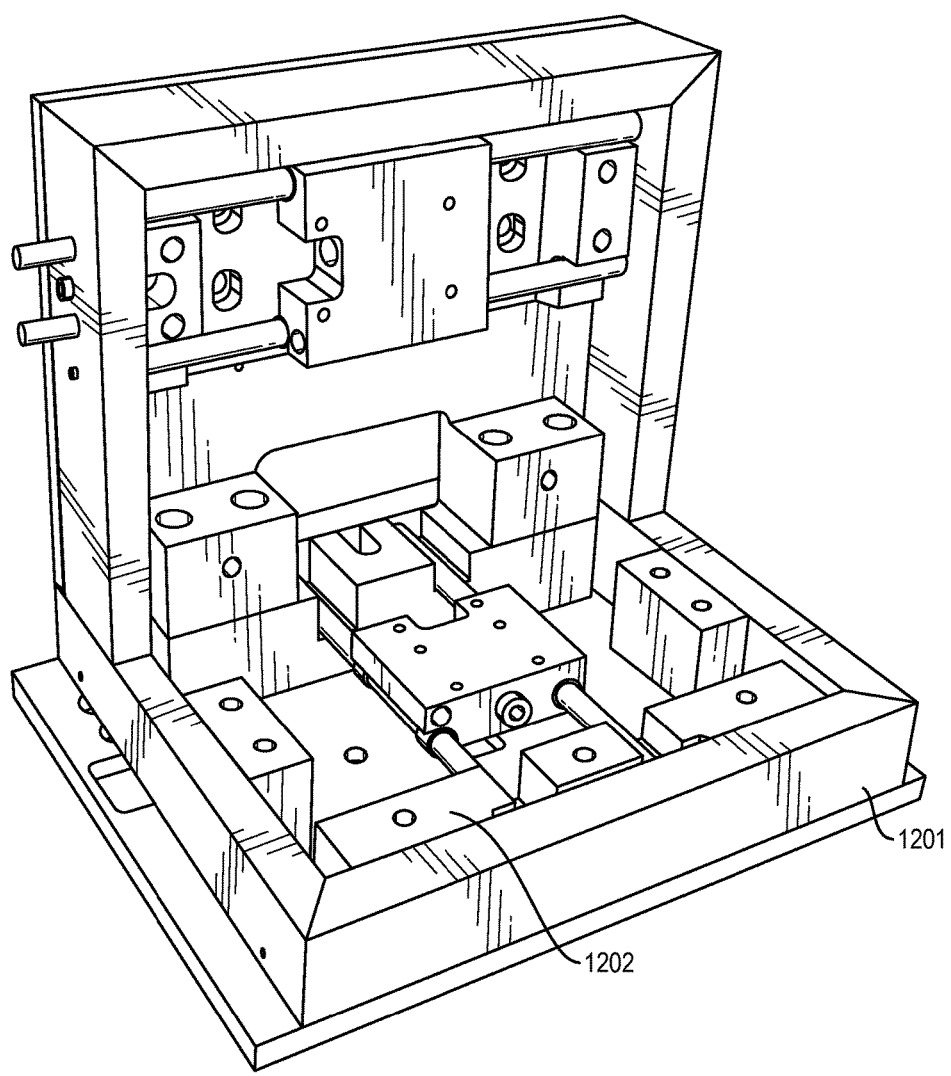
FIG. 12 is a perspective view of aspects of the machine tool of FIG. 9, during the process of construction.

FIG. 12 illustrates these fabricated extrusions 1201 bent and installed on a precision jig 1202. For the machine of FIG. 9, the structural frame is comprised of one extrusion that has been bent into a rectangular frame for the Y axis 902 and another extrusion bent into an upside-down U 903 for the X axis. The purpose of the jig is to properly align and constrain the elements of the machine during the casting process. The jig is not part of the machine tool itself.

Figure 13:
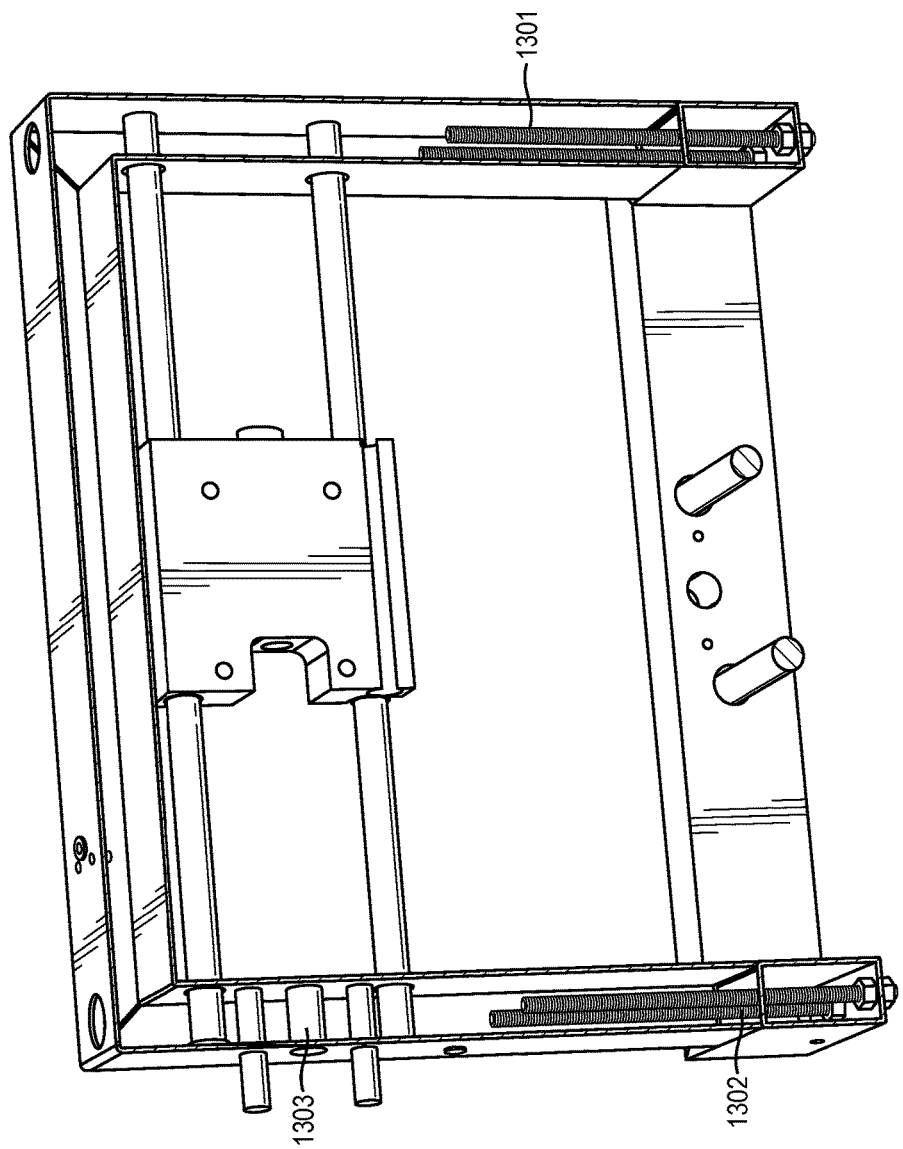
FIG. 13 is a cross section of a portion of the machine tool of FIG. 9.

The cross-section in FIG. 13 shows several elements of the structure. Most notable is the use of threaded rod 1301 and 1302 passing between the X and Y axis tubes whose purpose is to reinforce the cement interface between these two elements. Additionally, a cardboard 1303 pass-through tube is used to create a channel through the tube for the lead screw, and motor standoffs can be seen passing through one wall of the X axis tube.

Figure 14:
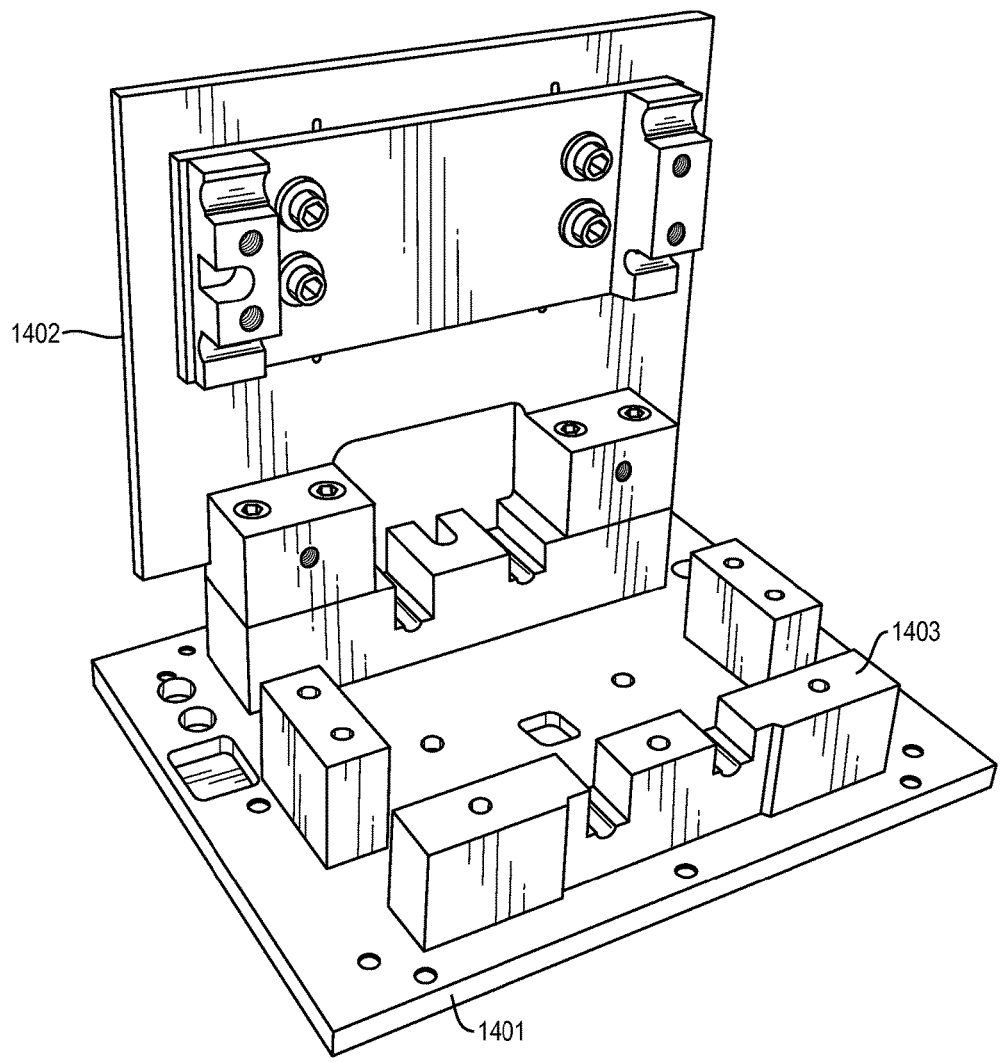
FIG. 14 is a perspective view of a jig used to construct the machine tool of FIG. 9.
Figure 15:
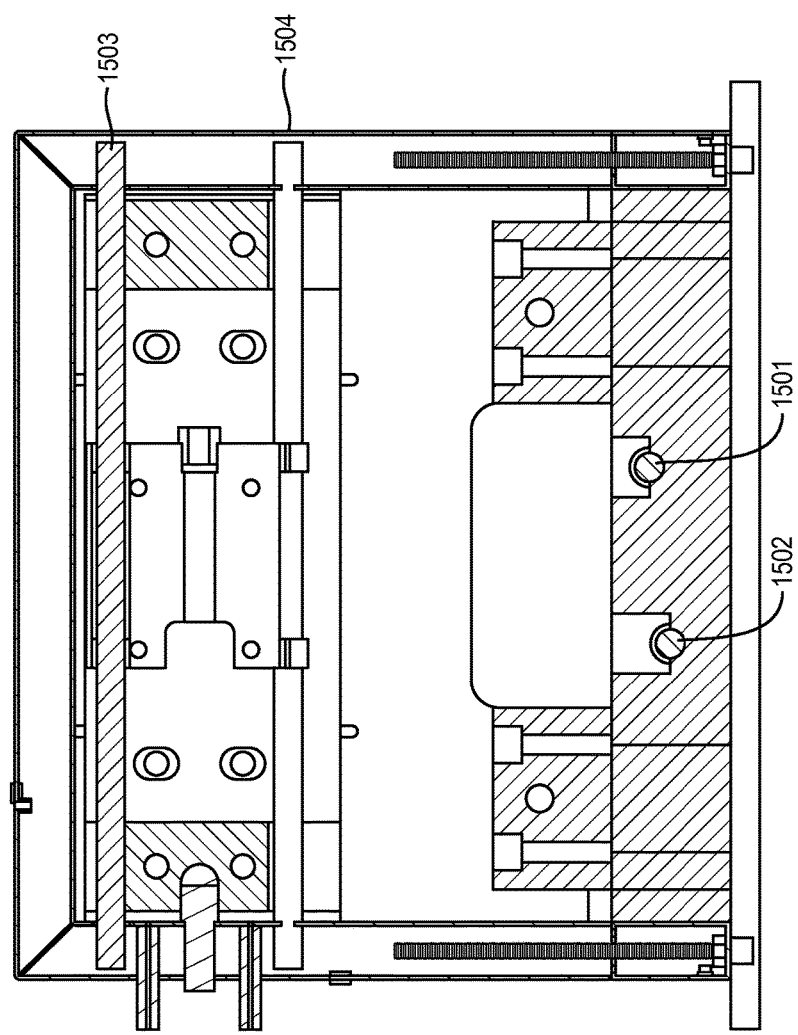
FIG. 15 is another cross section of a portion of the machine tool of FIG. 9.
Figure 16:
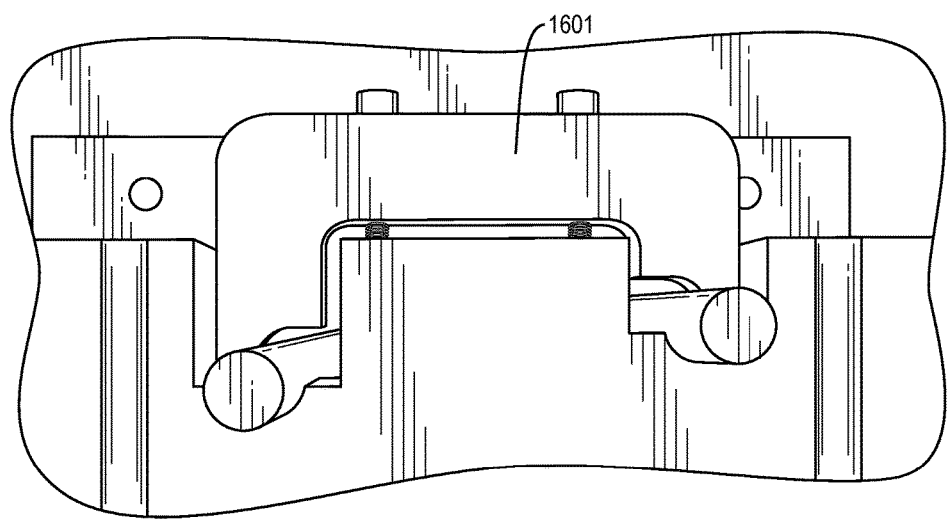
FIG. 16 is a detail of the clamping structures used in the manufacturing process of the embodiment of FIG. 9.
Figure 17:
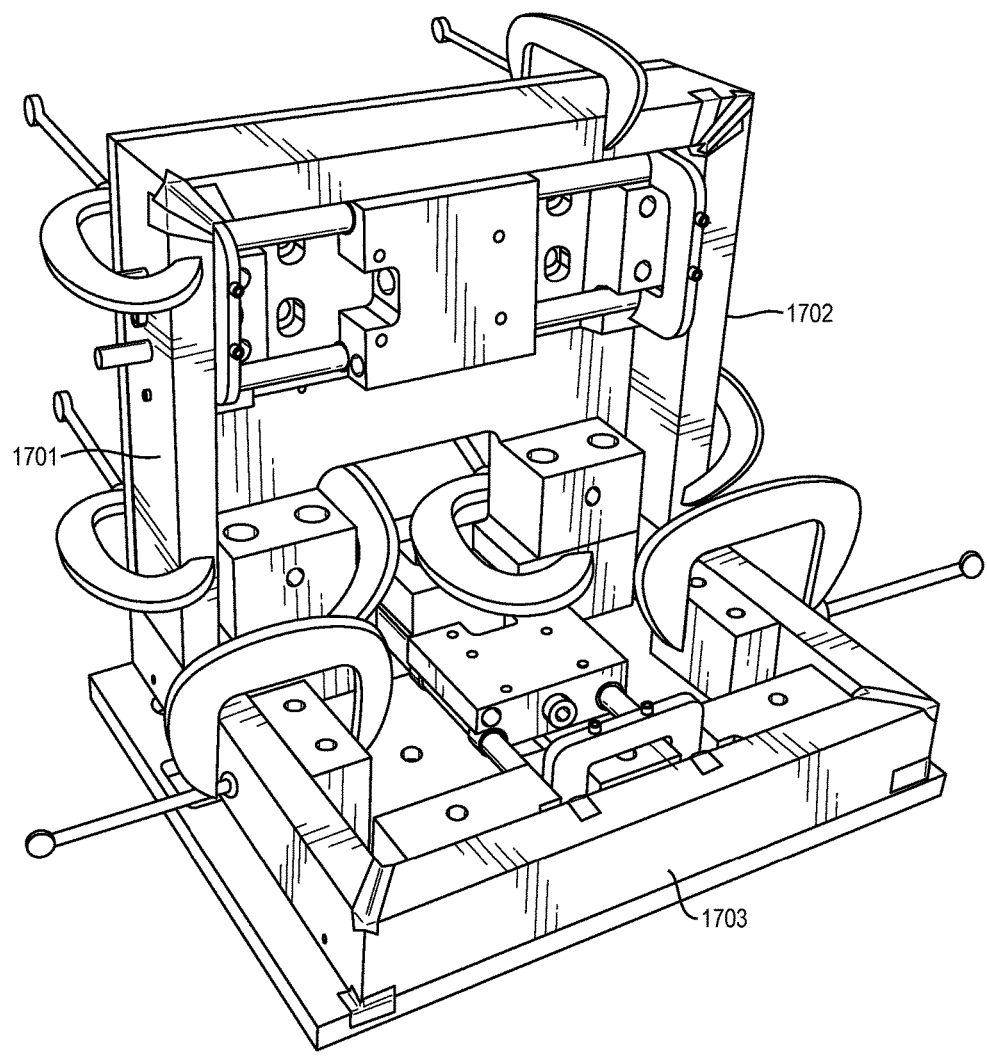
FIG. 17 is a perspective view of the clamping structures and jig used in the manufacturing process of the embodiment of FIG. 9.
Figure 18:
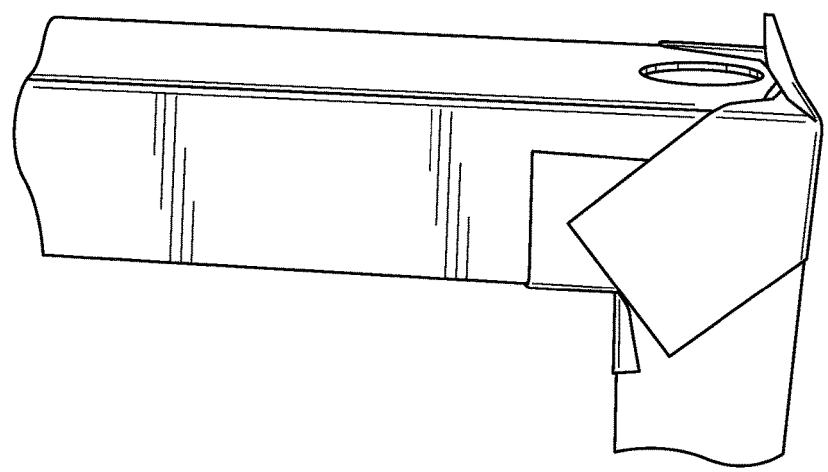
FIG. 18 is a detail showing taping of the box extrusion of FIG. 10 during the fill process.
Figure 19:
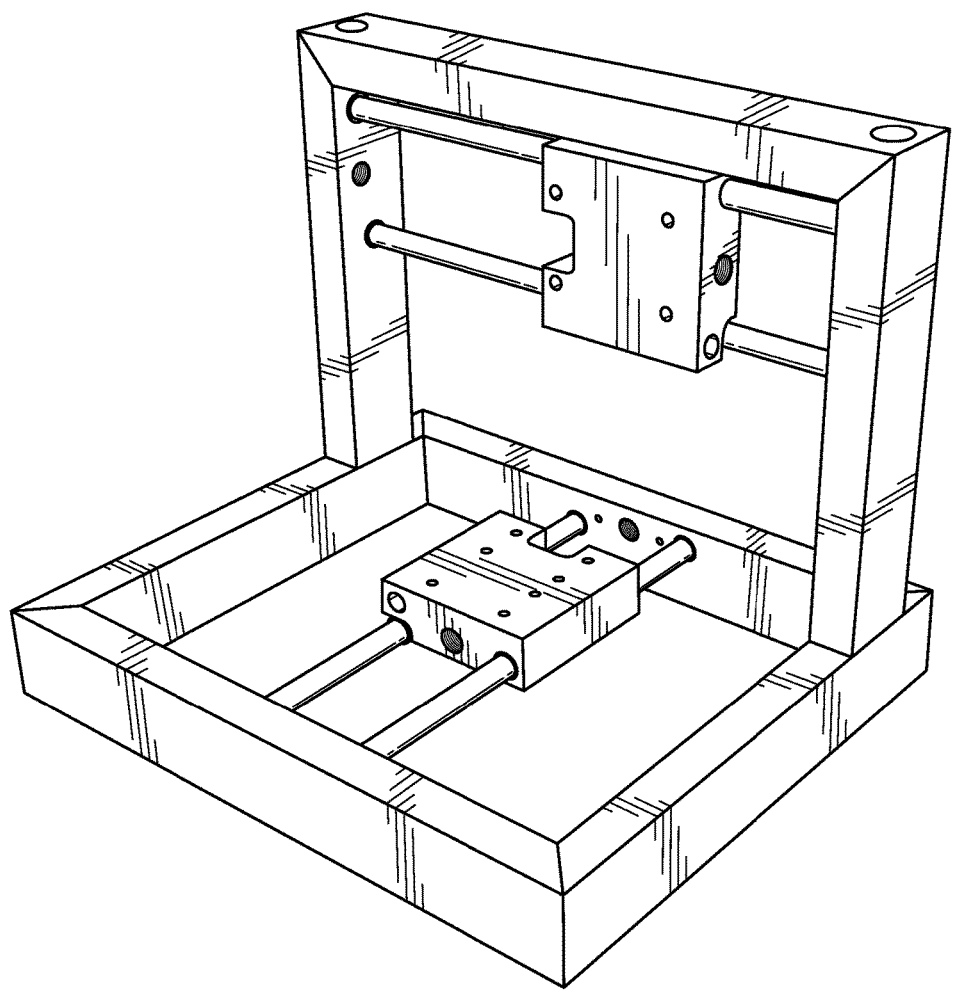
FIG. 19 is a perspective view of a partially completed manufacture of the embodiment of FIG. 9.

FIG. 14 is a drawing of the precision jig, which consists of three parts: a base plate 1401 that also acts to fixture the Y axis tube and motion components, a vertical back plate 1402 mounted perpendicular to the base plate, and a sliding X axis fixture 1403 used to fixture the X axis tube and motion components. The guide shafts 1501, 1502, 1503 and 1504 of each axis rest in shaft alignment features as shown in FIG. 15. Additionally, alignment pins are used to accurately locate the lead screw pass-through holes on the X and Y axes relative to the fixture. Clamps 1601 shown in FIG. 16 preload the shafts into the jig's alignment features during casting. FIG. 17 shows the structural tubes 1701, 1702, 1703 being clamped in place on the fixture, and motion components installed and fixtured to the jig. Tape is used to seal gaps in the structural tubes to prevent cement from leaking (detail shown in FIG. 18). The final product post-casting is shown in FIG. 19.

Figure 20:
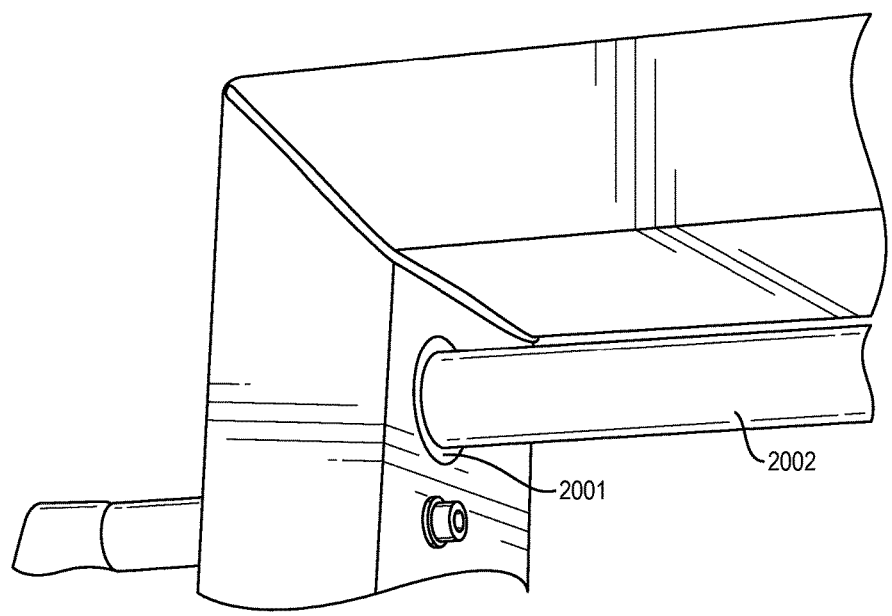
FIG. 20 is a detail of the shaft structure of the embodiment of FIG. 9.

The precision of the resulting machine is derived from the precision of the casting jig, not from the fabrication tolerances of the structural tubes. When the tubes are flooded with cement, the alignment of the jig is permanently copied to the machine. FIG. 20 illustrates the significant gap between one of the shaft entry holes 2001 and the guide shaft 2002 itself. This shaft entry hole could have been mislocated by several millimeters without affecting the final position of the shaft.

Figure 21:
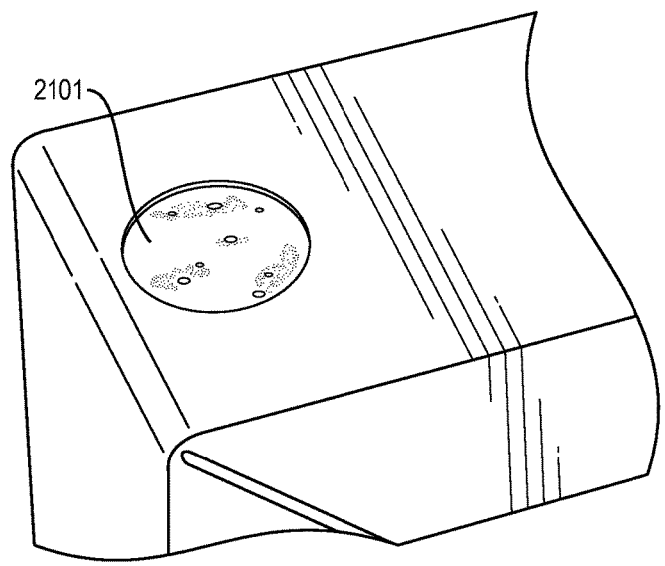
FIG. 21 is another detail showing the box extrusion of FIG. 10 during the fill process.

During the casting process, cement may be poured from the top of the machine through fill ports 2101—one of which is shown in FIG. 21. If the fill material is sufficiently non-viscous, the pressure generated by pouring from the top of the machine helps to fill oddly-shaped voids in the structure. Vibrating the entire machine and fixture can also help prevent air bubbles. The material preferred for constructing in the machine of FIG. 9—gypsum cement—has the property that it expands while curing. It is intended that this expansion, limited locally by the tubular structure, places the cement under compression. This is beneficial because cracks are less likely to occur in materials which are under compression. Expansion agents may be chosen along with the filler material to further increase this effect.

Figure 22:
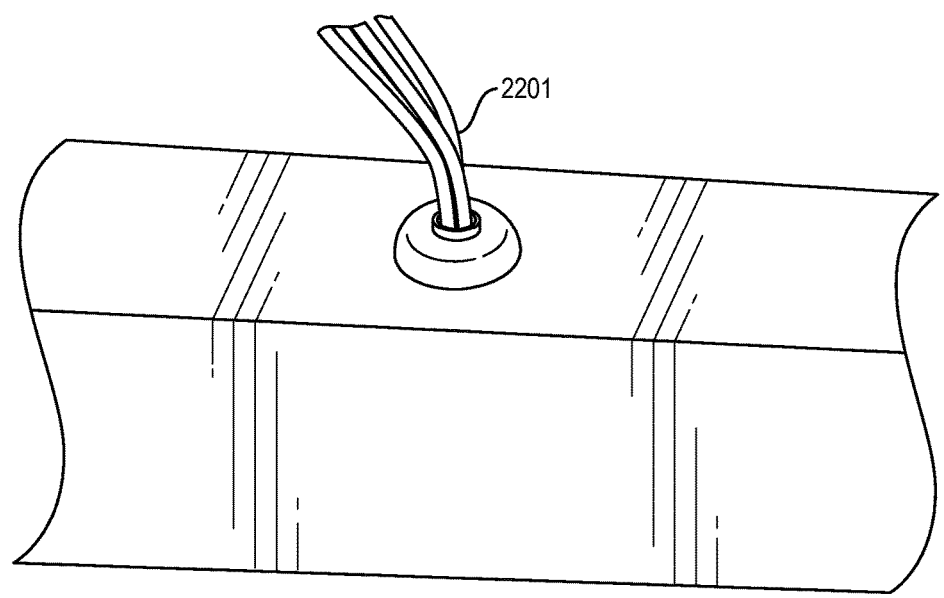
FIG. 22 is a detail of the extrusion of FIG. 10, showing electrical wiring passing through a hole.

FIG. 22 illustrates the routing of electrical and other cables 2201. Because the structure is comprised of tubes, it is possible to reduce cable routing clutter by running the cable through the tubes prior to the casting process.

In conclusion, the use of thin-walled tubular extrusion filled with a cast-able material on a precision jig offers several benefits over traditional machine construction techniques.

High stiffness and damping is achieved by the low-cost cast material in conjuncture with the tube material.

High precision fabrication is only done once during the creation of the jig, after which many high-precision machines can be manufactured from low-precision fabricated tubes.

While the invention has been described with particular reference to specific embodiments, it will be apparent to those skilled in the art that the same principles may be used in similar arrangements. The invention is not limited to the precise structures described. Various changes and modifications may be made without departing from the spirit and scope of the invention as defined by the claims below. For example, steps of a process can be in any order, unless the context clearly indicates otherwise.

What is claimed is:

1. A positioning tool apparatus comprising, in combination:
   first and second parallel tubes filled with cement separated from one-another and acting as first and second end blocks respectively for a single-axis linear motion stage the first and second end blocks either rigidly attached to a base plate or rigidly attached to one-another;
   each of the first and second end blocks having two guide seat holes, each guide seat hole aligned with a corresponding guide seat hole on the other end block;
   left and right parallel guide shafts extending between the end blocks, each guide shaft pressed into, or cemented in place in, the first end block at one end and the second end block at a second end;
   a carriage configured to ride on the guide shafts, the carriage having right and left sides, the right side of the carriage having a through-hole passing through the carriage fore and aft containing a pressed tubular bearing, the right guide shaft passing through the pressed tubular bearing;
   the left side of the carriage having a notch configured to receive a pair of floating tubular bearings, one fore and one aft, the left guide shaft passing through both floating bearings, the pair of floating bearings attached to the carriage with glue or epoxy; whereby,
   the carriage moves fore and aft along the guide shafts forming the linear motion stage.

2. The apparatus of claim 1, further comprising fixed bearings on each end block, and a drive screw or drive shaft passing through the fixed bearings, the drive screw or drive shaft also passing through the carriage and attached to the carriage such that when the drive screw or drive shaft is rotated, the carriage moves along the guide shafts.

3. The apparatus of claim 1 constructed by a process comprising:
   positioning the first and second parallel tubes to act as said first and second end blocks;
   constraining the first and second parallel tubes from moving using a precision fixed jig;
   inserting the left guide shaft through a first of the two guide seat holes in the first parallel tube, through the pressed tubular bearing of the carriage and through a first of the two guide seat holes in the second parallel tube;
   inserting the right guide shaft through a second of the two guide seat holes in the first parallel tube, through both floating bearings in the carriage and through a second of the two guide seat holes in the second parallel tube;
   aligning the guide shafts so that the carriage moves freely on the guide shafts, and then constraining the guide shafts from further movement with the jig;
   filling each of the first and second parallel tubes with liquid cement through pre-cut fill holes in the first and second parallel tubes;
   allowing the cement to set;
   attaching the floating bearings to the carriage with the glue or epoxy.

4. The apparatus of claim 3 wherein the cement is gypsum cement.

5. The apparatus of claim 3 wherein the process further comprises positioning rebar inside one or more of the parallel tubes before the cement solidifies.

6. The apparatus of claim 3, wherein:
   (a) a joint links the first and second parallel tubes; and
   (b) the joint is adjustable, such that adjustment of the joint causes the first and second parallel tubes to translate relative to each other.

7. The apparatus of claim 3 wherein, before the cement is introduced into the first and second parallel tubes, at least one electrical wire is positioned to extend into at least one of the first and second parallel tubes.

8. The apparatus of claim 3, wherein, the process includes bending one or more of the first and second parallel tubes after mitered cuts have been made in the one or more of the first and second parallel tubes.

9. The apparatus of claim 1, wherein the first and second end blocks are attached to the base plate, the first and second end blocks being located respectively at first and second ends of the base plate, the first and second end blocks extending upward from the base plate and are perpendicular to the base plate, and the first and second end blocks being cut from a single extrusion.

10. The apparatus of claim 1, wherein the cement comprises an expansive cement or includes expansion agents.

* * * * *